(12) United States Patent
Okawa

(10) Patent No.: US 7,557,833 B2
(45) Date of Patent: Jul. 7, 2009

(54) IMAGE PICK-UP DEVICE USING AN IMAGE SIGNAL OF A VARIABLE FRAME-RATE

(75) Inventor: Hiroshi Okawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 721 days.

(21) Appl. No.: 10/528,278

(22) PCT Filed: Jul. 16, 2004

(86) PCT No.: PCT/JP2004/010525

§ 371 (c)(1),
(2), (4) Date: Mar. 17, 2005

(87) PCT Pub. No.: WO2005/009029

PCT Pub. Date: Jan. 27, 2005

(65) Prior Publication Data
US 2005/0259172 A1    Nov. 24, 2005

(30) Foreign Application Priority Data
Jul. 18, 2003    (JP)    ............... 2003-276808

(51) Int. Cl.
*H04N 5/225*    (2006.01)
(52) U.S. Cl. .................. 348/220.1; 348/439.1
(58) Field of Classification Search .............. 348/220.1, 348/439.1, 454, 459, 222.1, 312; 386/110, 386/129, 131, 5
See application file for complete search history.

(56) References Cited

U.S. PATENT DOCUMENTS 3,723,644 A    3/1973    Haskell et al.
4,268,875 A *  5/1981    Morio et al. ................... 386/7
5,239,418 A    8/1993    Tyler et al.
2002/0021364 A1 *  2/2002    Asada et al. ................ 348/312

FOREIGN PATENT DOCUMENTS

JP    11-177930    7/1999
JP    2002-152569    5/2002

(Continued)

OTHER PUBLICATIONS

English Machine Translation of JP 11-177930 A (JP document published on Jul. 2, 1999).*
Patent Abstracts of Japan, vol. 1995, No. 2, Mar. 31, 1995 & JP 06 315133 A (Hitachi Ltd), Nov. 8, 1994.

*Primary Examiner*—Lin Ye
*Assistant Examiner*—Nelson D Hernández Hernández
(74) *Attorney, Agent, or Firm*—Frommer Lawrence & Haug LLP; William S. Frommer; Thomas F. Presson

(57) ABSTRACT

A signal-recording-and-reproducing portion records an image signal DVb of a variable frame-rate picked-up image generated by an image signal generation portion. When instructed to reproduce the image signal, the recorded signal is reproduced and supplied to a frame rate conversion portion as an image signal DVr. The frame rate conversion portion converts the image signals DVb and DVr to a display frame rate and supplies them to a monitor image signal generation portion as image signals DVb' and DVr'. The monitor image signal generation portion then generates a monitor image displaying images based on the image signals DVb' and DVr' on a screen. An adjustment of the frame rate referring to reproduced image displayed together with an image that is being shot allows an image signal to be easily generated so that a motion of a subject can be matched to a desired speed at the reproduction thereof.

9 Claims, 5 Drawing Sheets

FOREIGN PATENT DOCUMENTS

| | | |
|---|---|---|
| JP | 2002-320203 | 10/2002 |
| JP | 2004-7543 | 1/2004 |
| WO | WO 02/39737 | 5/2002 |
| WO | WO 03/085969 | 10/2003 |

* cited by examiner

F I G. 2

| VARIABLE FRAME RATE, FRc | NUMBER OF ADDED FRAMES, FA | IMAGE PICK-UP FRAME RATE, $FRp = FRc \times FA$ |
|---|---|---|
| $60P \geqq FRc > 30P$ | 1 | $60P \geqq FRp > 30P$ |
| $30P \geqq FRc > 20P$ | 2 | $60P \geqq FRp > 40P$ |
| $20P \geqq FRc > 15P$ | 3 | $60P \geqq FRp > 45P$ |
| $15P \geqq FRc > 12P$ | 4 | $60P \geqq FRp > 48P$ |
| $12P \geqq FRc > 10P$ | 5 | $60P \geqq FRp > 50P$ |
| $10P \geqq FRc > 6P$ | 6 | $60P \geqq FRp > 36P$ |
| $6P \geqq FRc > 5P$ | 10 | $60P \geqq FRp > 50P$ |
| $5P \geqq FRc > 4P$ | 12 | $60P \geqq FRp > 48P$ |
| $4P \geqq FRc > 3P$ | 15 | $60P \geqq FRp > 45P$ |
| $3P \geqq FRc > 2P$ | 20 | $60P \geqq FRp > 40P$ |
| $2P \geqq FRc > 1P$ | 30 | $60P \geqq FRp > 30P$ |
| 1P | 60 | 60P |

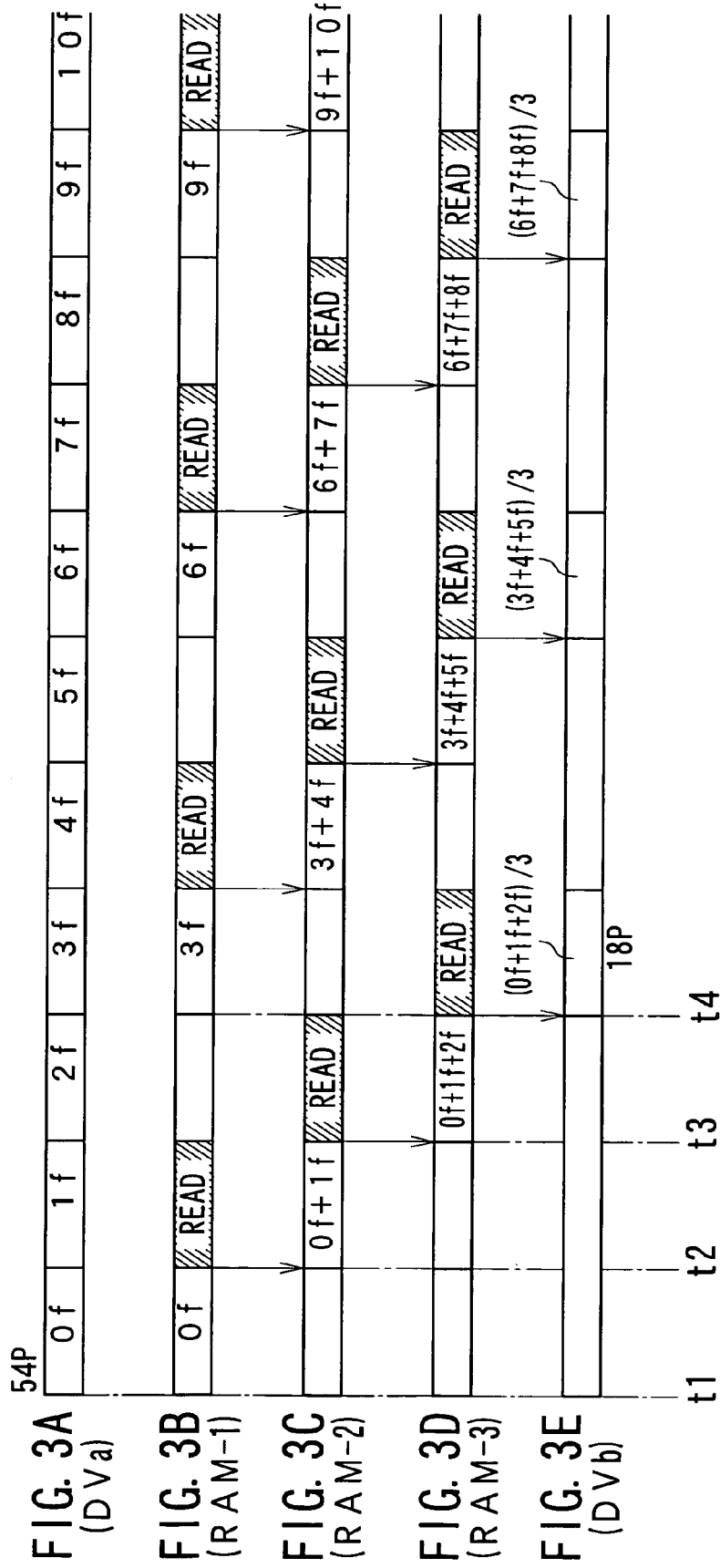

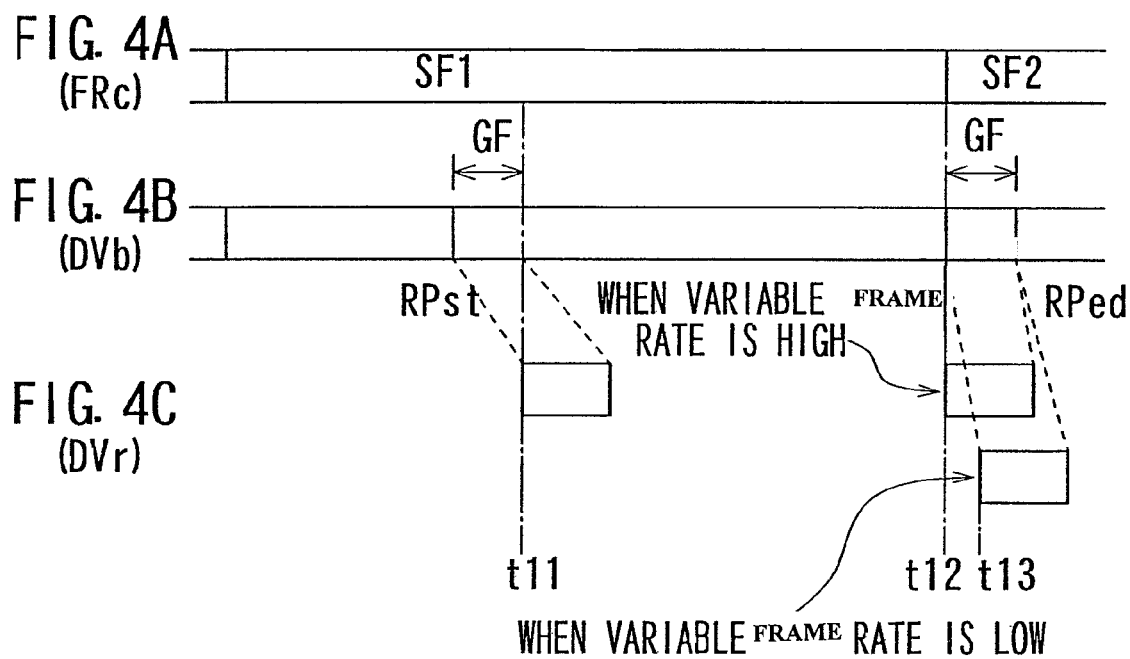

FIG. 5A
(DVb)
60P | mf−4 | mf−3 | mf−2 | mf−1 | mf | mf+1 | mf+2 | mf+3 | mf+4 | mf+5 | mf+6 | mf+7 | mf+8 | mf+9 | mf+10 | mf+11

FIG. 5B
(DVb')
30P | mf−4 | mf−2 | mf | mf+2 | mf+4 | mf+6 | mf+8 | mf+10

FIG. 5C
(DVr, DVr')
30P | (mf−GF) | (mf−GF)+1 | (mf−GF)+2 | (mf−GF)+3 | (mf−GF)+4 | (mf−GF)+5 t21

IMAGE PICK-UP DEVICE USING AN IMAGE SIGNAL OF A VARIABLE FRAME-RATE

TECHNICAL FIELD

The present invention relates to an image pick-up device. More specifically, it relates to reproducing, when recording an image signal of a variable frame-rate picked-up image generated by an image pick-up device if reproduction instruction of the recorded image signal is performed, this recorded signal at a reproduction frame rate so as to supply it to the image pick-up device, and generating a monitor image signal for displaying the variable frame-rate picked-up image and the reproduced image on one screen.

BACKGROUND ART

In conventional filmmaking etc., to obtain special video effects, scenes have been shot in condition where a shooting speed of a film camera, that is, the number of frames per second has been varied. For example, if a scene is shot at a higher speed than an ordinary one and reproduced at the ordinary speed, images are reproduced slowly. Therefore, fast motion of, for example, a water droplet falling into the water can be observed easily and in detail. If a scene is shot at a lower speed than the ordinary one and reproduced at the ordinary speed, on the other hand, fast motion of reproduced images can be seen. It is thus possible to enhance a sense of speed in a fight scene, a car chase scene, etc., thereby presenting images with an enhanced sense of reality.

Further, in TV program making etc., while an attempt has been made to digitize processing of image picking-up, editing, delivery, etc. of a program, an attempt has been made to digitize processing in film making etc. also as fueled by an increase in image quality and a decrease in costs caused by progress in digital technologies.

It is to be noted that if images are to be picked up using an image pick-up device (video camera) due to digitization of TV program making, filmmaking, etc., an image pick-up device is used which is described in Jpn. Pat. Appln. KOKAI Publication No. 2000-125210 and supposed to be capable of varying frame rates so that special video effects such as fast reproduction and slow reproduction can be obtained easily. By using this image pick-up device to pick up images at a lower speed than a predetermined frame rate and reproduce them at the predetermined frame rate, fast motion of the reproduced images can be obtained easily. By picking up the images at a higher frame rate and reproducing them at the predetermined frame rate, on the other hand, slow motion of the reproduced images can be obtained easily.

Generally, to pick up images at varied frame rates, an operation for varying a frame rate is carried out so that a person who picks up the images sets it to a frame rate that desired reproduced slow or fast images may be obtained, with those images envisioned in his or her mind. Therefore, if he or she has poor skills, even by varying the frame rate with the desired reproduced slow or fast images envisioned in his mind, those reproduced images may have totally different rates from a desired one, so that he or she must repeat the image picking-up.

DISCLOSURE OF THE INVENTION

An image pick-up device related to the present invention comprises image signal generation means for generating an image signal of a variable frame-rate picked-up image, signal-recording-and-reproducing means for recording and reproducing the image signal, frame rate conversion means for converting frame rates of the image signal generated by the image signal generation means and the image signal reproduced by the signal-recording-and-reproducing means into a display frame rate, monitor image signal generation means for generating a monitor image signal using an image signal having the display frame rate set by the frame rate conversion means, and control means for controlling operations of the image signal generation means and the signal-recording-and-reproducing means, wherein if it is instructed to reproduce the image signal recorded in the signal-recording-and-reproducing means during recording of the image signal by this signal-recording-and-reproducing means, the control means causes the signal-recording-and-reproducing means to reproduce the recorded image signal at a reproduction frame rate and also causes the monitor image signal generation means to generate the monitor image signal that displays on one screen a picked-up image based on the image signal generated by the image signal generation means and a reproduced image based on the image signal reproduced by the signal-recording-and-reproducing means.

In an image pick-up device that is connected to a signal-recording-and-reproducing device, the image pick-up device comprises image signal generation means for generating an image signal of a variable frame-rate picked-up image frame rate conversion means for converting frame rates of the image signal generated by the image signal generation means and an image signal supplied from the signal-recording-and-reproducing device into a display frame rate, monitor image signal generation means for generating a monitor image signal using an image signal having the display frame rate set by the frame rate conversion means, and control means for controlling operations of the image signal generation means and the signal-recording-and-reproducing device, wherein if it is instructed to reproduce the image signal recorded in the signal-recording-and-reproducing means during recording of the image signal by this signal-recording-and-reproducing means, the control means causes the signal-recording-and-reproducing means to reproduce the recorded image signal at a reproduction frame rate and also causes the monitor image signal generation means to generate the monitor image signal that displays on one screen a picked-up image based on the image signal generated by the image signal generation means and a reproduced image based on the image signal reproduced by the signal-recording-and-reproducing means.

In the present invention, when the signal-recording-and-reproducing means or a signal-recording-and-reproducing device is recording the image signal of the variable frame-rate picked-up image generated by the image signal generation means and also if an instruction is given to reproduce the recorded image signal, for example, a screen confirmation operation is performed as the reproduction instruction, the recorded signal is reproduced at the reproduction frame rate from a position, as reproduction start position, that is a preset number of frames ahead of a recording position where this image confirmation operation has been performed. Further, if alteration of a frame rate of the variable frame-rate picked-up image is used as the reproduction instruction, the reproduction position falls in a range between a recording position where the alteration has been performed and a position that is a preset number of frames ahead of this recording position and the recorded signal is reproduced at the reproduction frame rate at timing in accordance with a post-alteration frame rate. If the image signal generated by the image signal generation means and the image signal generated by the signal-recording-and-reproducing means or the signal-recording-and-reproducing device does not have a display frame rate, a frame rate conversion means converts the image signal into the display frame rate and supplies it to the monitor image signal generation means. The monitor image signal generation means generates a monitor image signal which displays on one screen a picked-up image based on the image signal generated by the image signal generation means and a reproduced image based on the image signal reproduced by the signal-recording-and-reproducing device.

BRIEF DESCRIPTION OF THE DRAWINGS

FIG. 2 is a diagram for showing a relationship of the number of added frames and an image pick-up frame rate with respect to a variable frame rate;

FIG. 3A is a diagram for explaining generation operation of an image signal DVb;

FIG. 3B is a diagram for explaining generation operation of the image signal DVb;

FIG. 3C is a diagram for explaining generation operation of the image signal DVb;

FIG. 3D is a diagram for explaining generation operation of the image signal DVb;

FIG. 3E is a diagram for explaining generation operation of the image signal DVb;

FIG. 4A is a diagram for explaining an operation, which is performed when a reproduction instruction is given;

FIG. 4B is a diagram for explaining the operation, which is performed when the reproduction instruction is given;

FIG. 4C is a diagram for explaining the operation, which is performed when the reproduction instruction is given;

FIG. 5A is a diagram for showing a signal, which is used to display a monitor image;

FIG. 5B is a diagram for showing the signal, which is used to display the monitor image; and FIG. 5C is a diagram for showing the signal, which is used to display the monitor image.

BEST MODE FOR CARRYING OUT THE INVENTION

Figure 1:
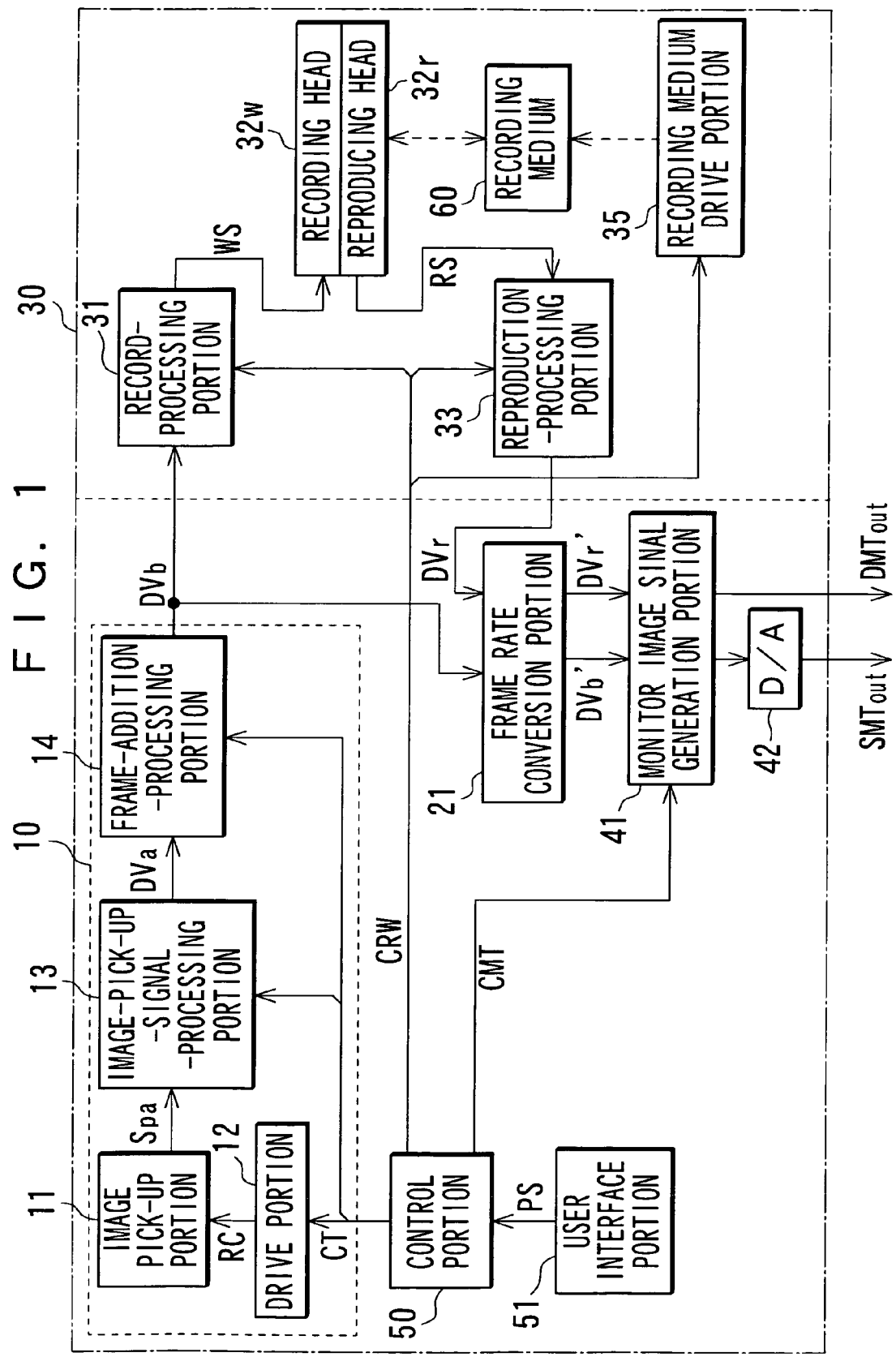
FIG. 1 is a diagram for showing a configuration of an image pick-up device.

The following will describe one embodiment of the present invention with reference to drawings. FIG. 1 shows a configuration of an image pick-up device. An image of a subject based on light entering through an image pick-up lens (not shown) is formed on an image pick-up surface of an image pick-up element (not shown) that constitutes an image pick-up portion 11 in an image signal generation portion 10. The image pick-up element generates image pick-up charge for the subject image through photoelectric transfer and reads this charge based on a drive-and-control signal RC supplied from a drive portion 12 to convert it into a voltage signal. Furthermore, it supplies this voltage signal as a picked-up image signal Spa to an image-pick-up-signal-processing portion 13.

The drive portion 12 generates the drive-and-control signal RC based on a control signal CT supplied from a control portion 50, which will be described later, and supplies it to the image pick-up portion 11.

The image-pick-up-signal-processing portion 13 amplifies the picked-up image signal Spa and removes a noise component from it. Further, it converts this noise-free image signal into a digital signal and performs feedback clamp processing, flare processing, correction processing on a defect of the image pick-up element, process treatment, etc. to generate an image signal DVa. This image signal DVa is supplied to a frame-addition-processing portion 14. It is to be noted that the signal-processing operation performed by the image-pick-up-signal-processing portion 13 is set on the basis of the control signal CT supplied from the control portion 50, which will be described later.

The frame-addition-processing portion 14 performs frame addition processing on the image signal DVa to vary a frame rate of the image signal DVa. This frame addition processing can be performed using a random access memory (RAM). For example, to perform three-frame addition, a first frame of the image signal DVa is stored in an RAM-1, the signal stored in which is read and added to a second frame of the image signal DVa and stored in an RAM-2. The sum signal stored in this RAM-2 is read and added to a third frame of the image signal DVa and stored in an RAM-3. The signal stored in this RAM-3 thus makes a signal adding the image signal DVa of the three frames, so that by reading this signal and multiplying its signal level by ($\frac{1}{3}$), a required signal level is obtained. Further, a fourth frame of the image signal DVa is stored in the RAM-1, the signal stored in which is read and added to a fifth frame of the image signal DVa and stored in the RAM-2. The sum signal stored in the RAM-2 is read and added to a sixth frame of the image signal DVa and stored in the RAM-3. The signal stored in this RAM-3 thus makes a signal adding the image signal DVa of the three frames, so that by reading this signal and multiplying its signal level by ($\frac{1}{3}$), a required signal level is obtained. Similarly, the image signal DVb having a frame rate obtained by multiplying its signal level by ($\frac{1}{3}$) and having a required signal level can be subsequently generated.

It is to be noted that the frame addition processing can be performed also using a frame delay circuit. For example, the first frame of the image signal DVa is delayed by a period of two frames through the frame delay circuit and the second frame of the image signal DVa is delayed by a period of one frame through the frame delay circuit. These delayed first frame of the image signal and second frame of the image signal DVa are added to the third frame of the image signal DVa to obtain a signal in which the image signal DVa of three frames is added. By multiplying the signal level of this signal by ($\frac{1}{3}$), it is possible to obtain the image signal DVb having a required signal level and its frame rate obtained by multiplying the signal level of this signal by ($\frac{1}{3}$).

By thus performing the frame addition processing, if a frame rate of the image signal DVa is, for example, "60P" (where the numeral indicates the number of frames per second and P stands for progressive signal, which holds true also with the other cases) and the number of added frames is two, an image signal of a variable frame-rate picked-up image with a frame rate of "30P" can be obtained. Further, if the number of added frames is four, an image signal of a variable frame-rate picked-up image with a frame rate of "15P" can be obtained.

Furthermore, not only by changing over the number of added frames but also by controlling signal reading from the image pick-up element so as to vary the frame rate of the picked-up image signal Spa, the frame rate of the image signal DVb can be varied continuously. That is, by controlling the frame rate of the picked-up image signal Spa and the number of added frames in the frame addition processing, it is possible to generate the image signal DVb of a variable frame-rate picked-up image with a desired frame rate. In such a manner, the image signal DVb generated by the frame-addition-processing portion 14 is supplied to a frame rate conversion portion 21 and a record-processing portion 31 in a signal-recording-and-reproducing portion 30.

To vary the frame rate of the picked-up image signal Spa, the drive-and-control signal RC supplied from the drive portion 12 to the image pick-up portion 11 can be used to control a charge accumulation period, an image pick-up charge read timing, etc. at the image pick-up element, thereby obtaining the picked-up image signal Spa with the varied frame rate. Furthermore, by varying an image pick-up frame rate FRp by adjusting a length of a horizontal or vertical blanking interval on the assumption that the common data rate scheme (CDR: common sampling frequency scheme) is used, it is possible to generate such a picked-up image signal Spa that an image size in a valid screen period does not change even if the image pick-up frame rate FRp is varied. Further, by using the CDR scheme, it becomes unnecessary to vary an operating frequency of each of the components that use the image pick-up frame rate FRp in accordance with the image pick-up frame rate FRp, thereby simplifying the configuration thereof.

The frame rate conversion portion 21 converts a frame rate of the image signal DVb or an image signal DVr supplied from the later-described signal-recording-and-reproducing portion 30 into a display frame rate that matches an electronic viewfinder or a monitor device and supplies it to a monitor image signal generation portion 41. For example, by sequentially storing the image signal DVb into the RAM and reading these stored image signals at the display frame rate for each frame, the image signal DVb can be converted into an image signal DVb' having the display frame rate. Further, by processing the image signal DVr similarly, it can be converted into the image signal DVr' having the display frame rate. It is to be noted that if the frame rate of the image signal DVb or DVr is equal to the display frame rate, the supplied image signal is delivered to the monitor image signal generation portion 41.

Based on a control signal CRW from the control portion 50, the record-processing portion 31 performs modulation processing, error-correcting code addition processing, etc. on the supplied image signal DVb, to generate a record signal WS. This record signal WS is supplied to a recording head 32W to record a variable frame-rate picked-up image in a random-accessible recording medium 60 such as, for example, an optical disc or a magnetic disk. Further, the variable frame-rate picked-up image recorded in the recording medium 60 is read by a reproducing head 32R and an obtained read signal RS is supplied to a reproduction-processing portion 33. The reproduction-processing portion 33 performs error correcting processing and demodulation processing on the read signal RS based on the control signal CRW, to supply the thus obtained image signal DVr to the frame rate conversion portion 21. It is to be noted that a recording medium drive portion 35 drives the recording medium 60 based on the control signal CRW from the control portion 50.

Based on a monitor output control signal CMT from the later-described control portion 50, the monitor image signal generation portion 41 generates an image signal DVp (not shown) that displays an image based on the image signal DVb' and an image based on the image signal DVr' on one screen. Furthermore, the monitor image signal generation portion 41 selects either one of the image signals DVb' and DVr' and the thus generated image signal DVp and supplies it as a monitor image signal DMTout to the electronic viewfinder or the monitor device. Further, to output an analog signal, a D/A conversion portion 42 can convert the monitor image signal DMTout into an analog monitor image signal SMTout and output it.

To the control portion 50, a user interface portion 51 is connected. When supplied with an operation signal PS in accordance with a user operation through this user interface portion 51, the control portion 50 generates the control signals CT etc. based on this operation signal PS, to control operations of the portions, thereby operating the image pick-up device in accordance with the user operation. Further, when supplied, through the user interface portion 51, with a frame rate set signal RSF which sets a frame rate of a picked-up image, the control portion 50 controls a frame rate of the picked-up image signal Spa to be generated by the image pick-up portion 11 and the number of added frames to be used by the frame-addition-processing portion 14, by using the control signal CT based on the frame rate set signal RSF. For example, the control portion 50 switches an image pick-up speed at, for example, an operation portion and, when supplied with the frame rate set signal RSF or with the frame rate set signal RSF from a remote-control device or external equipment, the control portion 50 controls a frame rate of the picked-up image signal Spa to be generated by the image pick-up portion 11 or the number of added frames to be used by the frame-addition-processing portion 14.

Furthermore, the portion generates the control signal CRW based on the operation signal PS and supplies it to the signal-recording-and-reproducing portion 30, thereby controlling operations of this signal-recording-and-reproducing portion 30. Further, the portion also generates the monitor output control signal CMT and supplies it to the monitor image signal generation portion 41, thereby controlling operations of this monitor image signal generation portion 41.

Next, operations of the image pick-up device will be described. A frame rate (variable frame rate FRc) of a variable frame-rate picked-up image which is set by the frame rate set signal RSF can be varied continuously by changing over a frame rate (image pick-up frame rate FRp) of the picked-up image signal Spa which is generated by the image pick-up portion 11 and the number of added frames FA which is used by the frame-addition-processing portion 14 as described above. For example, as shown in FIG. 2, when the variable frame rate FRc is set into a range of "60P≧FRc>30P" by the frame rate set signal RSF, the number of added frames FA is set to "1" and the image pick-up frame rate FRp is equalized to the variable frame rate FRc. When the variable frame rate FRc is set into a range of "30P≧FRc>20P", the number of added frames FA is set to "2" and the image pick-up frame rate FRp is set to double the variable frame rate FRc. When the variable frame rate FRc is set into a range of "20P≧FRc>15P", the number of added frames FA is set to "3" and the image pick-up frame rate FRp is set to triple the variable frame rate FRc. Subsequently, by similarly changing over the image pick-up frame rate FRp and the number of added frames FA, the variable frame rate FRc can be varied continuously.

The control portion 50 generates the control signal CT based on the supplied frame rate set signal RSF and supplies it to the image pick-up portion 11 and the frame-addition-processing portion 14, thereby controlling a frame rate of the picked-up image signal Spa and the number of added frames in such a manner that the image signal DVb may have a frame rate in accordance with the frame rate set signal RSF.

FIGS. 3A-3F are diagrams each for explaining generation of the image signal DVb, which shows a case where the RAM-1 through the RAM-3, an adder, etc. are used to perform frame addition processing as described above. For example, if the variable frame rate FRc is "18P", the image pick-up frame rate FRp is "54P" and the number of added frames FA is "3" as shown in FIG. 2. It is to be noted that FIG. 3A shows frames of the image signal DVa, FIGS. 3B, 3C, and 3D show operations of the RAM-1, RAM-2, and RAM-3 of the frame-addition-processing portion 14, respectively, and FIG. 3E shows frames of the image signal DVb.

At time point t1 when frame "0f" of the image signal DVa starts, the frame-addition-processing portion 14 sets, for example, the RAM-1 as a write RAM and stores the image signal DVa of frame "0f" in the write RAM.

At time point t2 when frame "0f" of the image signal DVa ends and its frame "1f" starts, the RAM-1 where the image signal of frame "0f" is stored is specified as an internal read RAM and the write RAM is changed over from the RAM-1 to, for example, the RAM-2. Furthermore, the signal stored in the internal read RAM, that is, the signal of frame "0f" stored in the RAM-1 is read and added to the image signal DVa of frame "1f" by an adder and stored in the RAM-2, which is the write RAM.

At time point t3 when frame "1f" of the image signal DVa ends and its frame "2f" starts, to generate a three-frame sum signal, the RAM-2 in which the sum signal of frames "0f" and "1f" is written is specified as the internal read RAM. Further, the write RAM is changed over from the RAM-2 to, for example, the RAM-3. Furthermore, the signal stored in the internal read RAM, that is, the signal stored in the RAM-2 is read and added to the image signal DVa of frame "2f" by the adder and stored in the RAM-3, which is the write RAM.

At time point t4 when frame "2f" of the image signal DVa ends and its frame "3f" starts, the three-frame sum signal obtained by adding up the image signal DVa of three frames is generated completely, so that the RAM-3 in which this three-frame sum signal is stored is specified as an external read RAM. Further, the RAM-1 is set as the write RAM, to store the image signal DVa of frame "3f" in the write RAM.

After the three-frame sum signal is generated, this three-frame sum signal is read from the external read RAM and its signal level is multiplied by (⅓), so that it is output as the image signal DVb.

Subsequently, by similarly using the RAM-1 through the RAM-3, the adder, etc. to add up the image signal DVa of three frames so that a three-frame sum signal may be generated and its signal level is multiplied by (⅓), it is possible to obtain the image signal DVb having a variable frame rate FRc.

The frame rate conversion portion 21 converts this image signal DVb into the image signal DVb' having a display frame rate and supplies it to the monitor image signal generation portion 41. Further, the control portion 50 generates the monitor output control signal CMT and supplies it to the monitor image signal generation portion 41 and outputs the image signal DVb' as the monitor image signal DMTout from the monitor image signal generation portion 41 so that a variable frame-rate picked-up image can be displayed on the electronic viewfinder or the monitor device.

In the case of recording the image signal DVb in the recording medium 60, operations of the signal-recording-and-reproducing portion 30 are controlled using the control signal CRW from the control portion 50 so that a recording of the image signal DVb performed in order to allow an image signal recorded in it to be read even during recording of the image signal DVb. For example, by accumulating signals of variable frame-rate picked-up images once temporarily and then recording these accumulated signals into the recording medium 60 at a high speed, the variable frame-rate picked-up images are recorded discontinuously time-wise. By thus recording variable frame-rate picked-up images discontinuously, recorded image signals can be read even during recording of the image signal DVb. Further, by mounting the recording head 32W and the reproducing head 32R separately from each other so that they can operate independently of each other, recorded image signals can be read even when the generated record signals WS are being recorded sequentially into the recording medium 60.

When displaying a variable frame-rate picked-up image recorded in the recording medium 60 on the electronic viewfinder or the monitor device, the control portion 50 controls operations of the signal-recording-and-reproducing portion 30 to read a signal stored in the recording medium 60 so that the image signal DVr may be generated and supplied to the frame rate conversion portion 21. The frame rate conversion portion 21 converts the image signal DVr into the image signal DVr' having a display frame rate and supplies it to the monitor image signal generation portion 41. Further, the control portion 50 supplies the monitor output control signal CMT to the monitor image signal generation portion 41 so that this monitor image signal generation portion 41 may output the image signal DVr' as the monitor image signal DMTout, thereby displaying the variable frame-rate picked-up image recorded in the recording medium on the electronic viewfinder or the monitor device.

Next, operations will be explained in a case where a reproduction instruction is given to confirm whether an image can be reproduced at a desired speed when images are picked up at varied frame rates, with reference to FIGS. 4A-4C. FIG. 4A shows the variable frame rate FRc, FIG. 4B shows the image signal DVb, and FIG. 4C shows the image signal DVr. At time point t11 when the variable frame rate FRc is, for example, "SF1", if image confirmation is performed, the control portion 50 sets a reproduction start position RPst at the signal-recording-and-reproducing portion 30 in such a manner that an image signal may be read as much as a predetermined number, GF, of immediately previously recorded frames, to read the signal starting from the reproduction start position RPst, thus generating the image signal DVr. Further, the control portion 50 supplies the monitor output control signal CMT to the monitor image signal generation portion 41 so that the control portion may generate the image signal DVp that displays an image based on the image signal DVb' and an image based on the image signal DVr' on one screen during a period when the image signal of the predetermined number of immediately previously recorded frames is being read. It further causes this image signal DVp to be output as the monitor image signal DMTout.

In this case, at the electronic viewfinder or the monitor device, a variable frame-rate image being picked up and a reproduced image of the immediately previously recorded variable frame-rate picked-up image are displayed simultaneously on, for example, a main screen and a sub-screen of the one screen respectively for a lapse of time as long as the predetermined number of frames GF. FIGS. 5A-5C are diagram each for showing signal which is used to display a monitor image. If, for example, the variable frame rate FRc is "60P", the display frame rate is "30P", and the reproduction frame rate is "30P", such frames as shown in FIG. 5A are given by the image signal DVb. This image signal DVb is converted by the frame rate conversion portion 21 into the image signal DVb' shown in FIG. 5B. That is, a variable frame-rate picked-up image is displayed on the basis of the image signal DVb' obtained by thinning the image signal DVb every other frame. Further, since the frame rate of the image signal DVr is equal to a display frame rate, the image signal DVr shown in FIG. 5C is supplied as the image signal DVr' to the monitor image generation portion 41. In this case, if the image signal DVb gives frame "mf" at time point t21, frame "mf-GF" is present at the reproduction start position RPst. Further, since the recorded image signal DVb is sequentially read at a frame rate of "30P" to provide the image signal DVr, a reproduced image is displayed at ½ an actual motion speed. It is to be noted that if the variable frame rate FRc is equal to a reproduction frame rate, a motion speed of a subject in a reproduced image is equal to an actual motion speed of the subject. Further, if the variable frame rate FRc is lower than the reproduction frame rate, the motion speed of the subject in the reproduced image increases.

In such a manner, the motion speed of the subject in a reproduced image varies in accordance with the variable frame rate FRC, which is frame rate that is set by the person who picks up the image, so that it is possible to confirm whether the set frame rate is appropriate, during imaging. Therefore, by referencing a reproduced image displayed together with an image being picked up, the frame rate can be set simply. Further, since the frame rate can be set easily so as to give a desired speed, it is possible to avoid, for example, imaging again, which is useful in the case of fewer picked-up opportunities. For example, to pick up a rotating wheel of an automobile in such a manner that it may appear to be at rest, the frame rate can be simply set by referencing the reproduced image so that the wheel may appear to be at rest.

Further if an image is picked up as varying the frame rate, illumination flicker appears in the picked-up image depending on the set frame rate, so that the picked-up image cannot have a good picture quality in some cases. In such cases also, it is possible to confirm a reproduced image of the picked-up image during picking-up, thus easily setting an appropriate frame rate varying range. Therefore, even with only one picked-up opportunity, a picked-up image with a good picture quality can be obtained.

Although, in the above embodiment, an image being picked up and a reproduced image of an immediately previously recorded variable frame-rate picked-up image have been displayed on one screen for image confirmation, a change in variable frame rate, if any, may be used as a reproduction instruction. For example, if the variable frame rate FRc is changed from "SF1" to "SF2" at time point t12 shown in FIGS. 4A-4C, a range from a recording position at time point t12 to a reproduction end position RPed which is distant from this recording position by a preset predetermined number of frames GF is set as a reproduction position, so that an image signal at this reproduction position is automatically read, to display a reproduced image together with a variable frame-rate picked-up image.

In this case, if the variable frame rate FRc is higher than a frame rate of the image signal DVr, the image signal DVb has a larger number of frames than the image signal DVr, so that when the variable frame rate is changed, reproduction is immediately started from a recording position where this change is made, to read the image signal as much as the preset predetermined number of frames GF. If the variable frame rate FRc is lower than a frame rate of the image signal DVr, on the other hand, the image signal DVb has a smaller number of frames than the image signal DVr. Therefore, when the variable frame rate is changed and if reproduction is immediately started from a recording position where this change is made, reading gets ahead of recording of the image signal DVb in timing. To avoid this, the reproduction starting timing is delayed in accordance with a post-change variable frame rate. For example, reproduction is started at time point t13 delayed behind time point t12, from a recording position where the variable frame rate is changed.

In this case, only by changing the variable frame rate, a variable frame-rate image picked up at this changed frame rate is reproduced during a predetermined lapse of time, so that it is possible to easily confirm whether the post-change variable frame rate is adequate, without performing image confirmation. If the variable frame rate is not changed after a reproduced image is displayed, a variable frame-rate image being picked up is displayed on the entire screen of the electronic viewfinder or the monitor device, so that it is possible to properly pick up a desired subject as referencing the displayed image. Further, by controlling timing to start reproduction in accordance with a changed variable frame rate, it is possible to immediately confirm a motion speed after the variable frame rate is changed, without giving rise to a discontinuity between the reproduced images.

Further, if the frame rate of the image signal DVb is equal to that of the image signal DVr, the motion speed in a reproduced image is equal to an actual motion speed. Therefore, when the variable frame rate FRc is changed to a value different from the frame rate of the image signal DVr and if this change is used as a reproduction instruction, it is possible to prevent a reproduced image having the actual motion speed from being displayed together with a variable frame-rate picked-up image. Further, if a reproduction instruction is automatically given every predetermined lapse of time, it is possible to pick up images at a variable frame rate as confirming a reproduced image of a recorded variable frame-rate picked-up image.

Although the above embodiment has been described with reference to a case where the image pick-up device is provided with the signal-recording-and-reproducing portion 30 for recording and reproducing the image signal DVb, also in a case where the signal-recording-and-reproducing device is connected to the image pick-up device so that a signal output from the image pick-up device may be recorded and reproduced by the signal-recording-and-reproducing device, the above-described processing can be performed to easily generate an image signal of a variable frame-rate picked-up image so that the subject may move at a desired speed when reproduced.

Although, in the above embodiment, the frame-addition-processing portion 14 has performed frame addition processing on the image signal DVa to generate the image signal DVb so that the frame rate of the image signal DVa may be varied and the frame rate conversion portion 21 has controlled write and read operations to the RAMs to convert the frame rates of the image signals DVb and DVr into the display frame rate, the generation of the image signal DVb and the conversion of the frame rates of the image signals DVb and DVr are not limited to such processing. For example, frame addition is performed to equalize the frame rates of the image signals DVb and DVr to the display frame rate or write and read operations to the RAMs may be controlled to generate the image signal DVb. Furthermore, any other frame rate varying method, for example, frame thinning is performed to decrease the number of frames or an interpolated image by use of motion prediction is generated to increase the number of frames, thereby varying the frame rate.

According to the present invention, when an image signal of a variable frame-rate picked-up image generated by the image signal generation means is recorded and if it is instructed to reproduce this recorded image signal, the recorded signal is reproduced at a reproduction frame rate. If neither of the image signal generated by the image signal generation means and the reproduced image signal has a display frame rate, these image signals have their frame rates converted by the frame rate conversion means into the display frame rate and are supplied to the monitor image signal generation means. The monitor image signal generation means generates a monitor image signal that displays on one screen an picked-up image based on the image signal generated by the image signal generation means and an picked-up image based on the reproduced image signal. Therefore, an image being picked up and a reproduced image of a variable frame-rate picked-up image are displayed simultaneously on one screen, so that by adjusting the frame rate as referencing the reproduced image displayed together with the image being picked up, it is possible to easily generate the image signal of the variable frame-rate picked-up image so that the subject may move at a desired speed when reproduced.

Further, if image confirmation is performed as a reproduction instruction, a position that is before a recording position where this image confirmation is performed by a preset number of frames in timing is set as a reproduction start position, to reproduce the recorded image signal at the reproduction frame rate. Therefore, the person who picks up the images, if he or she has performed image confirmation, can check to see if the image signal has been recorded in such a manner that the subject may move at a desired speed when reproduced.

Furthermore, if a change in frame rate of a variable frame-rate picked-up image is used as a reproduction instruction, a range from a recording position where this change is made to a position that is distant from this recording position by a preset number of frames is set as a reproduction position, to reproduce the recorded signal at the reproduction frame rate. Therefore, if the frame rate is changed, the reproduced image is displayed automatically during a lapse of time as much as a preset number of frames without performing image confirmation to check to see if the subject moves at a desired speed when reproduced after the changing of the frame rate, so that it is possible to confirm whether a post-change frame rate is adequate.

Further, if the post-change variable frame rate is higher than the reproduction frame rate, a range from a recording position where the change is made to a position that is distant from this recording position by the preset number of frames is reproduced together with a reproduction instruction and if the post-change variable frame rate is lower than the reproduction frame rate, starting of reproduction is delayed with respect to the reproduction instruction in accordance with the post-change variable frame rate, so that the reproduced images can be displayed without discontinuity.

INDUSTRIAL APPLICABILITY

As described above, an image pick-up device according to the present invention could well be applied to the case of picking up images as varying a frame rate, to obtain special video effects such as fast reproduction and slow reproduction.

The invention claimed is:

1. An image pick-up device comprising:
   image signal generation means for generating an image signal of a variable frame-rate picked-up image;
   signal-recording-and-reproducing means for recording and reproducing the image signal;
   frame rate conversion means for converting frame rates of the image signal generated by the image signal generation means and the image signal reproduced by the signal-recording-and-reproducing means into a display frame rate;
   frame addition processing means for continuously varying the frame rates of the image signal;
   monitor image signal generation means for generating a monitor image signal using an image signal having the display frame rate set by the frame rate conversion means and varied by the frame addition processing means; and
   control means for controlling operations of the image signal generation means and the signal-recording-and-reproducing means,
   wherein the frame addition processing means adds a predetermined number of frames to the image data,
   wherein the frame addition processing means varies the frame rates of the image signal to any integer by adding frames to the image data and by changing an image pick-up frame rate,
   wherein if it is instructed to reproduce the image signal recorded in the signal-recording-and-reproducing means during recording of the image signal, the control means causes the signal-recording-and-reproducing means to reproduce the recorded image signal at a reproduction frame rate and the control means causes the monitor image signal generation means to generate the monitor image signal that displays simultaneously on one screen a picked-up image based on the image signal generated by the image signal generation means and a reproduced image based on the image signal reproduced by the signal-recording-and-reproducing means.

2. The image pick-up device according to claim 1, wherein when image confirmation is performed as the reproduction instruction, the control means sets a position that is ahead of a recording position where the image confirmation is performed by a preset number of frames, as a reproduction start position of the signal-recording-and-reproducing means.

3. The image pick-up device according to claim 1, wherein the control means uses a change in frame rate of the variable frame-rate picked-up image as the reproduction instruction, to set a range from a recording position where the change is made to a position that is distant from this recording position by a preset number of frames, as a reproduction position which is used by the signal-recording-and-reproducing means.

4. The image pick-up device according to claim 3, wherein if a post-change variable frame rate is higher than the reproduction frame rate, the control means causes the signal-recording-and-reproducing means to start reproduction together with the reproduction instruction and, if the post-change variable frame rate is lower than the reproduction frame rate, delays starting of the reproduction with respect to the reproduction instruction in accordance with the post-change variable frame rate.

5. An image pick-up device that is connected to a signal-recording-and-reproducing device, the image pick-up device comprising:
   image signal generation means for generating an image signal of a variable frame-rate picked-up image;
   frame rate conversion means for converting frame rates of the image signal generated by the image signal generation means and an image signal supplied from the signal-recording-and-reproducing device into a display frame rate;
   frame addition processing means for continuously varying the frame rates of the image signal;
   monitor image signal generation means for generating a monitor image signal using an image signal having the display frame rate set by the frame rate conversion means and varied by the frame addition processing means; and
   control means for controlling operations of the image signal generation means and the signal-recording-and-reproducing device,
   wherein the frame addition processing means adds a predetermined number of frames to the image data,
   wherein the frame addition processing means varies the frame rates of the image signal to any integer by adding frames to the image data and by changing an image pick-up frame rate, wherein if it is instructed to reproduce the image signal recorded in the signal-recording-and-reproducing means during recording of the image signal, the control means causes the signal-recording-and-reproducing device to reproduce the recorded image signal at a reproduction frame rate and the control means causes the monitor image signal generation means to generate the monitor image signal that displays simultaneously on one screen a picked-up image based on the image signal generated by the image signal generation means and a reproduced image based on the image signal reproduced by the signal-recording-and-reproducing device.

6. The image pick-up device according to claim 5, wherein when image confirmation is performed as the reproduction instruction, the control means sets a position that is ahead of a recording position where the image confirmation is performed by a preset number of frames, as a reproduction start position in the signal-recording-and-reproducing device.

7. The image pick-up device according to claim 5, wherein the control means uses a change in frame rate of the variable frame-rate picked-up image as the reproduction instruction, to set a range from a recording position where this change is made to a position that is distant from the recording position by a preset number of frames, as a reproduction position in the signal-recording-and-reproducing device.

8. The image pick-up device according to claim 7, wherein if a post-change variable frame rate is higher than the reproduction frame rate, the control means causes the signal-recording-and-reproducing device to start reproduction together with the reproduction instruction and,
if the post-change variable frame rate is lower than the reproduction frame rate, delays starting of the reproduction with respect to the reproduction instruction in accordance with the post-change variable frame rate.

9. An image pick-up device comprising:
an image signal generation portion that generates an image signal of a variable frame-rate picked-up image;
a signal-recording-and-reproducing portion that records and reproduces the image signal;
a frame rate conversion portion that converts frame rates of the image signal generated by the image signal generation portion and the image signal reproduced by the signal-recording-and-reproduction portion into a display frame rate;
frame addition processing portion that continuously varies the frame rates of the image signal;
a monitor image signal generation portion that generates a monitor image signal using an image signal having the display frame rate set by the frame rate conversion portion and varied by the frame addition processing portion; and
a controller that controls operations of the image signal generation portion and the signal-recording-and-reproducing portion,
wherein the frame addition processing portion adds a predetermined number of frames to the image data,
wherein the frame addition processing portion varies the frame rates of the image signal to any integer by adding frames to the image data and by changing an image pick-up frame rate,
wherein if it is instructed to reproduce the image signal recorded in the signal-recording-and-reproducing portion during recording of the image signal, the controller causes the signal-recording-and-reproducing portion to reproduce the recorded image signal at a reproduction frame rate and the controller causes the monitor image signal generation portion to generate the monitor image signal that displays simultaneously on one screen a picked-up image based on the image signal generated by the image signal generation portion and a reproduced image based on the image signal reproduced by the signal-recording-and-reproducing portion.

* * * * *